US012693175B2

(12) United States Patent
Yin et al.

(10) Patent No.: US 12,693,175 B2
(45) Date of Patent: Jul. 28, 2026

(54) SENSITIVITY TESTING DEVICE AND METHOD TO CALIBRATE THE DISTRIBUTED OPTIC-FIBER TEMPERATURE SENSING SYSTEM FOR INFLOWS AND INFILTRATIONS IDENTIFICATION IN DRAINAGE PIPELINE

(71) Applicant: TONGJI UNIVERSITY, Shanghai (CN)

(72) Inventors: Hailong Yin, Shanghai (CN); Yiyang Hu, Shanghai (CN); Zuxin Xu, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 294 days.

(21) Appl. No.: 18/678,728

(22) Filed: May 30, 2024

(65) Prior Publication Data

US 2025/0044169 A1 Feb. 6, 2025

Related U.S. Application Data

(63) Continuation of application No. PCT/CN2023/130166, filed on Nov. 7, 2023.

(30) Foreign Application Priority Data

Aug. 3, 2023 (CN) .......................... 202310973926.8

(51) Int. Cl.
*G01K 15/00* (2006.01)
*G01K 11/3206* (2021.01)
(52) U.S. Cl.
CPC ........ *G01K 15/007* (2013.01); *G01K 11/3206* (2013.01); *G01K 15/005* (2013.01)

(58) Field of Classification Search
CPC ............. G01K 15/007; G01K 11/3206; G01K 15/005; G01K 11/32; G01K 15/00; G01K 15/002
See application file for complete search history.

(56) References Cited

U.S. PATENT DOCUMENTS

2008/0181554 A1 7/2008 Taverner et al.
2016/0168980 A1 6/2016 Bedry et al.
(Continued)

FOREIGN PATENT DOCUMENTS

CN 102313696 A 1/2012
CN 110057471 A 7/2019
(Continued)

OTHER PUBLICATIONS

Maryam Beheshti, et al., Quantification Assessment of Extraneous Water Infiltration and Inflow by Analysis of the Thermal Behavior of the Sewer Network, Water, 2018, pp. 1-17, vol. 10.
(Continued)

*Primary Examiner* — Rufus L Phillips
(74) *Attorney, Agent, or Firm* — Bayramoglu Law Offices LLC

(57) ABSTRACT

A sensitivity testing device and method calibrates the distributed optic-fiber temperature sensing (DOFTS) system for inflow and infiltration (I/I) identification in drainage pipeline. A temperature-adjustable water supply tank is provided with a heating rod and a high-accuracy physical water temperature sensor and is electrically connected with a centralized programmable logic controller (PLC) system; the temperature-adjustable water supply tank is connected with a water inlet of a water pump through a first connecting pipe; a water outlet of the water pump is communicated with a water inlet of an experimental pipeline through a second connecting pipe; and a water outlet of the experimental
(Continued)

pipeline is communicated with the temperature-adjustable water supply tank through a third connecting pipe.

17 Claims, 2 Drawing Sheets

(56) References Cited

U.S. PATENT DOCUMENTS

| | | | | |
|---|---|---|---|---|
| 2018/0172524 A1* | 6/2018 | Su | ......................... | G01K 15/002 |
| 2023/0324234 A1* | 10/2023 | Wang | ................... | G01K 11/324 |
| | | | | 374/161 |

FOREIGN PATENT DOCUMENTS

| | | | |
|---|---|---|---|
| CN | 113029382 | A | 6/2021 |
| CN | 115164116 | A | 10/2022 |
| CN | 115575608 | A | 1/2023 |
| CN | 115931179 | A | 4/2023 |
| CN | 116858399 | A | 10/2023 |
| JP | 2008310682 | A | 12/2008 |
| KR | 20220166579 | A | 12/2022 |
| WO | 2017190476 | A1 | 11/2017 |

OTHER PUBLICATIONS

Yin Hai-Long, et al., A method on sewer inflow identification using fiber-optic distributed temperature sensing, China Environmental Science, 2022, pp. 1737-1744, vol. 42 No. 4.

* cited by examiner

SENSITIVITY TESTING DEVICE AND
METHOD TO CALIBRATE THE
DISTRIBUTED OPTIC-FIBER
TEMPERATURE SENSING SYSTEM FOR
INFLOWS AND INFILTRATIONS
IDENTIFICATION IN DRAINAGE PIPELINE

CROSS REFERENCE TO RELATED
APPLICATIONS

This application is a continuation application of International Application No. PCT/CN2023/130166, filed on Nov. 7, 2023, which is based upon and claims foreign priority to Chinese Patent Application No. 202310973926.8, filed on Aug. 3, 2023, the entire contents of which are incorporated herein by reference.

TECHNICAL FIELD

The present invention relates to the technical field of sewage treatment, and in particular, to a simulation device and a simulation method for distributed optical fiber temperature sensing in a drainage pipeline.

BACKGROUND

Drainage network is an important urban infrastructure and plays an important role in improving the water quality of receiving waters. At present, the length of urban drainage pipelines in China exceeds 870,000 km, 47.5% of which have been used for more than 10 years. However, improper coordination between the existing urban storm water drainage pipe network and the newly developed sewage pipe network, and the unexpected scenarios such as ground subsidence, poor construction quality of pipeline and pipe joints, and in-pipe corrosions, result in both widespread illicit sewage connections into storm water pipes and severe pipe defects. On one hand, sewage illicitly connecting to storm water pipes is finally delivered into the water bodies without treatment. On another hand, large amounts of extraneous water such as groundwater and storm water would inflow and infiltrate into sewer pipes through the sewer defect points, reducing low biodegradability of wastewater treatment plant inflow and also bringing additional treatment costs. As a result, currently the actual sewage treatment ratio in China is only 66%, far below the data of approximate 90% in developed countries. In response to improving sewage collection ratio in China, practitioners have endeavored to identify available techniques to detect the sewer defect and illicit connection points, and then perform rehabilitation or correction measures for these concerns.

As a real-time monitoring technology, distributed fiber-optic temperature sensing provides the ability to detect, along with optical fiber, the spatial distribution of surrounding environmental quantities such as temperature, so that locations with abnormal in-pipe water temperature changes are determined and real-time pre-warning is practiced. As a technology enabling in-pipe spatial-temporal water temperature mapping which is similar to auscultation, distributed fiber-optic temperature sensing detects the inflow and infiltration (I/I) points which result in sewer defect and illicit connection accurately by identifying locations with abnormal in-pipe water temperature changes. Compared with the technology based on closed circuit television detection which needs sewer blocking and prerequisite pipe draining, distributed fiber-optic temperature sensing enabling non-disrupted timely monitoring of sewer, even under the circumstances of high in-pipe water level. In addition, it also has the advantage of high-frequency spatiotemporal monitoring. Therefore, the reliability of sewer problematic points identification can be further improved, especially the accurate identification of external water dynamic I/I points.

Noises produced by distributed fiber-optic temperature sensing system are quite common during the data acquisition and transmission. The quality of temperature data directly affects the reliability of data analysis, especially when the temperature between the extraneous water and the water in-pipe is close, unreasonable noise level identification would cause misdiagnosis of the results. Therefore, it is necessary to determine the background noise level of temperature sensing data of an optical fiber, as well as the sensitivity of the distributed fiber-optic temperature sensing system to detect sewer problematic points.

Therefore, how to establish a sensitivity testing device and simulation method to calibrate the distributed optic-fiber temperature sensing system (DOFTS) for I/I identification in in drainage pipeline, to achieve noise level identification of optical fiber sensing system in drainage pipelines and determination of detection sensitivity of the optical fiber sensing system, is one of the urgent technical problems endeavored to be solved in this field.

SUMMARY

In view of this, the present invention provides a sensitivity testing device to calibrate the DOFTS for I/I identification in drainage pipeline, and aims to address the above-mentioned needs. To solve the aforementioned technical problems, the present invention adopts the following technical solution:

A sensitivity testing device to calibrate the DOFTS for I/I identification in drainage pipeline is provided. The device includes a temperature-adjustable water supply tank, a water pump, an experimental pipeline, a unit of simulating external water I/I into experimental pipeline, a centralized programmable logic controller (PLC) system, and a DOFTS for I/I identification, wherein the temperature-adjustable water supply tank is communicated with a water inlet of the water pump through a first connecting pipe; a water outlet of the water pump is communicated with a water inlet of the experimental pipeline through a second connecting pipe; a water outlet of the experimental pipeline is communicated with the temperature-adjustable water supply tank through a third connecting pipe; a water outlet of a temperature-adjustable water storage tank for simulating external water I/I into experimental pipeline is communicated with a water inlet of a connecting pipe; a water outlet of the connecting pipe is communicated with a top wall of the experimental pipeline through a water distribution pipe; a high-accuracy physical water temperature sensor is arranged in the experimental pipeline, and the high-accuracy physical water temperature sensor in experimental pipeline is electrically connected to the centralized PLC system; the DOFTS for I/I identification includes a data acquisition and transmission system of distributed optical fiber and an optical fiber; the data acquisition and transmission system of distributed optical fiber comprises: a pulse laser source, a data acquisition card, and a photoelectric converter; a first end of the optical fiber is connected to the pulse laser source; a second end of the optical fiber is laid within the experimental pipeline; the pulse laser source emits laser to the optical fiber; the laser is transmitted into the experimental pipeline along the optical fiber and is scattered in the experimental pipeline; the scattered laser is transmitted back to the DOFTS for I/I identification through the optical fiber; the data acquisition card acquires the scattered laser and decodes the acquired information through the photoelectric converter, and temperature information inside the experimental pipeline is obtained;

Preferably, a second end of the optical fiber is threaded out of a side wall of the experimental pipeline.

Preferably, a frequency converter is provided with the water pump, and the frequency converter is electrically connected to the centralized PLC system.

Preferably, a gas release hole is set up in a top side of the experimental pipeline, and the gas release hole is equipped with a detachable plug.

Preferably, an I/I hole is set up in a top side of the experimental pipeline, and the I/I hole is equipped with a detachable plug.

Preferably, a first one-way electromagnetic control valve and a first electromagnetic flow meter are arranged on the first connecting pipe;

a second one-way electromagnetic control valve and a second electromagnetic flow meter are arranged on the second connecting pipe;

a third one-way electromagnetic control valve and a third electromagnetic flow meter are arranged on the third connecting pipe;

the centralized PLC system is electrically connected to the first one-way electromagnetic control valve, the first electromagnetic flow meter, the second one-way electromagnetic control valve, the second electromagnetic flow meter, the third one-way electromagnetic control valve, and the third electromagnetic flow meter respectively.

Preferably, a first heating rod and a high-accuracy physical water temperature sensor in water supply tank are inserted into the temperature-adjustable water supply tank, and the first heating rod and the high-accuracy physical water temperature sensor in water supply tank are electrically connected to the centralized PLC system respectively.

Preferably, a sensitivity testing device to calibrate the DOFTS for I/I identification in drainage pipeline includes a unit of simulating external water I/I into experimental pipeline, wherein, the unit of simulating external water I/I into experimental pipeline comprises: a temperature-adjustable water storage tank for simulating external water I/I into experimental pipeline, a water tank connecting pipe, and a water distribution pipe; a water outlet of the temperature-adjustable water storage tank for simulating external water I/I into experimental pipeline is communicated with a water inlet of the connecting pipe; a water outlet of the connecting pipe is communicated with a side wall of the experimental pipeline through the water distribution pipe.

Preferably, a second heating rod and a high-accuracy physical water temperature sensor in (I/I) water storage tank in are inserted into the temperature-adjustable water storage tank for simulating external water I/I into experimental pipeline, and the second heating rod and the high-accuracy physical water temperature sensor in (I/I) water storage tank are electrically connected to the centralized PLC system respectively;

an electric regulating valve and an electromagnetic flow meter are arranged on the connecting pipe, and the electric regulating valve and the electromagnetic flow meter are electrically connected to the centralized PLC system respectively.

A simulation method for distributed optical fiber temperature sensing in a drainage pipeline, wherein the method comprises the following steps:

S1, opening the first one-way electromagnetic control valve, the second one-way electromagnetic control valve, and the third one-way electromagnetic control valve in sequence, and turning on the water pump;

S2, opening the electric regulating valve on a connecting pipe, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensors at designated stations, and transmitting water temperature information to the centralized PLC system;

S4, transmitting the laser emitted by the pulse laser into the experimental pipeline along the optical fiber, and scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline;

S5, comparing water temperature data displayed in the centralized PLC system with water temperature data measured by the distributed optical fiber sensing system, and determining noises and the detection sensitivity of the optical fiber sensing system.

Preferably, in steps S1, heating of the first heating rod is regulated; heating of the second heating rod is regulated; temperatures of in-pipe water and external I/I water are controlled; various combination scenarios of inflow rate, water temperature of experimental pipeline and those of I/I water are tested.

The present invention achieves the following technical effects:

1. A High-accuracy physical water temperature sensor is arranged in the experimental pipeline, and the high-accuracy physical water temperature sensor is electrically connected to the centralized PLC system for temperature collection at designated locations; the laser emitted by the pulse laser source is transmitted into the experimental pipeline along the optical fiber, and the transmitted laser is scattered back to the data acquisition and transmission system of distributed optical fiber through the optical fiber; the information acquired by the data acquisition card is decoded through the photoelectric converter to obtain spatial-temporal continuous temperature information in the experimental pipeline; so that temperature sensing data of an optical fiber can be detected and calibrated according to measured temperature of high-accuracy physical water temperature sensors, and finally, noises of optical fiber sensing system in the drainage pipeline are identified, and the detection sensitivity of the optical fiber sensing system is determined.

2. The second end of the optical fiber is threaded out of a side wall of the experimental pipeline; so that the entire optical fiber can be continuously fixed.

3. The operating frequency of the water pump is controlled through the frequency converter, enabling to control the flow rate.

4. The in-pipe air in the experimental pipeline can be released through the gas release hole, so that experiments in a full-pipe state can be performed.

5. The first heating rod and the second heating rod heat the water, which can simulate damages in operating drainage pipeline in each season.

In conclusion, the present invention is compact in structure and reasonable in arrangement. The experiment pipeline, the temperature-adjustable water supply tank, and the external I/I simulation system of the present invention simulate the I/I scenarios in operating drainage pipeline; the high-accuracy physical water temperature sensor is electrically connected to the centralized PLC system for temperature collection at designated locations; the distributed optical fiber sensing system performs spatial-temporal continuous measurement of water temperature within the experiment pipeline, so that temperature sensing data of an optical fiber can be detected and calibrated according to measured temperature of high-accuracy physical water temperature sensors; and finally, noises of optical fiber sensing system in the drainage pipeline are identified, and the detection sensitivity of the optical fiber sensing system is determined.

IN THE DRAWINGS

1—temperature-adjustable water supply tank; 11—first heating rod; 12—high-accuracy physical water temperature sensor in water supply tank;

2—water pump;

3—experimental pipeline; 31—high-accuracy physical water temperature sensor in experimental pipeline; 32—gas release hole; 33—external I/I hole;

4—centralized PLC system; 41—PLC programming module; 42—frequency converter; 43—control screen;

5—DOFTS for I/I identification; 51—data acquisition and transmission system of distributed optical fiber; 52—optical fiber;

6—unit of simulating external water I/I into experimental pipeline; 61—temperature-adjustable water storage tank; 611—second heating rod; 612—high-accuracy physical water temperature sensor in I/I water storage tank; 62—water tank connecting pipe; 63—water distribution pipe; and

7—support frame.

DETAILED DESCRIPTION OF THE EMBODIMENTS

The technical solutions in the embodiments of the present invention will be clearly and completely described below with reference to the drawings in the embodiments of the present invention, and it is obvious that the described embodiments are only a part of the embodiments of the present invention but not all of them. Based on the embodiments of the present invention, all other embodiments obtained by those of ordinary skills in the art without creative effort shall fall within the protection scope of the present invention.

EMBODIMENTS

Figures 1, 2:
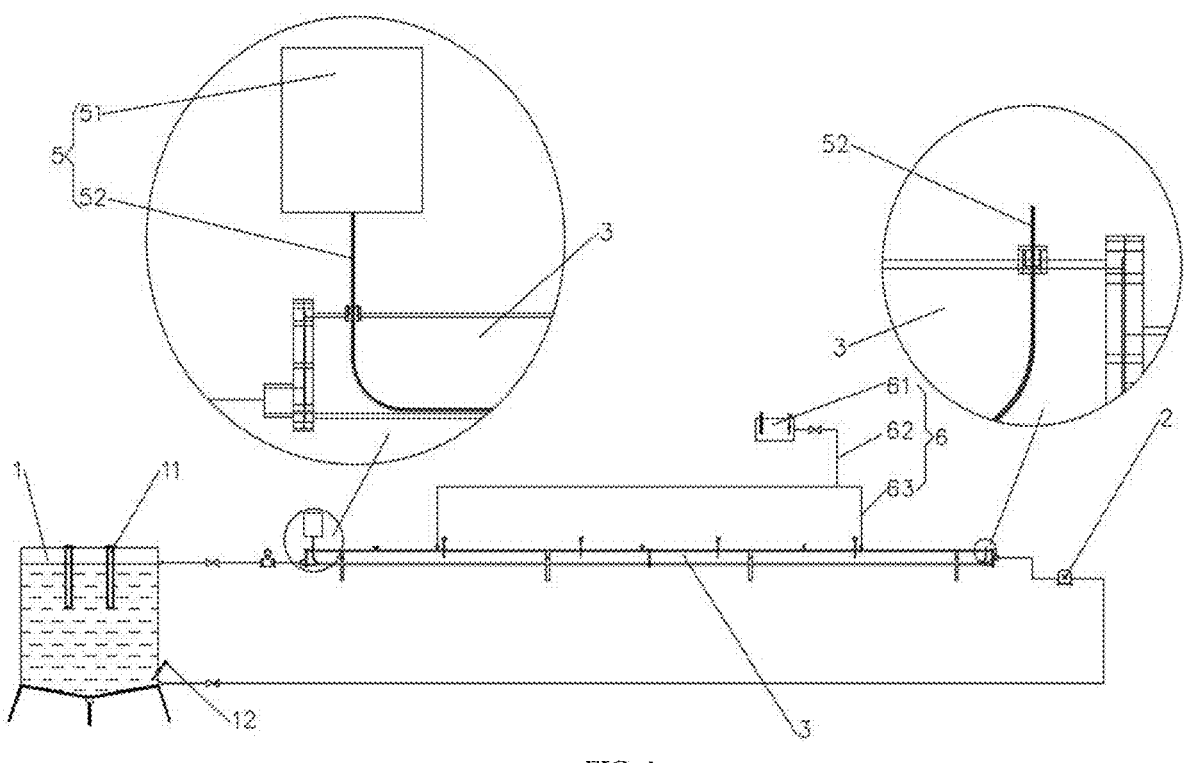
FIG. 1 is a schematic diagram of an overall structure according to the present invention.
FIG. 2 is a schematic structural diagram of a unit of simulating external water I/I into experimental pipeline according to the present invention.
Figures 3, 4:
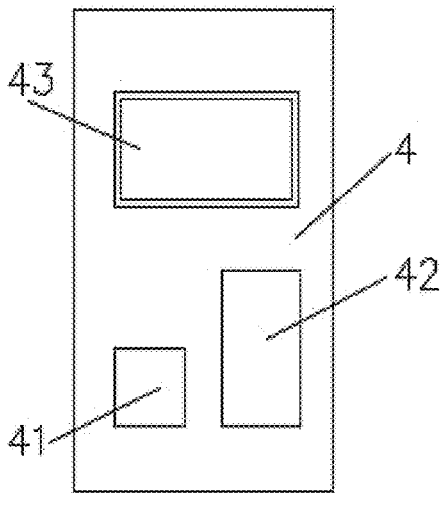
FIG. 3 is a schematic structural diagram of a centralized PLC system according to the present invention.
FIG. 4 is a schematic structural diagram of an experimental pipeline according to the present invention.

Referring to FIG. 1 to FIG. 4, a sensitivity testing device and method to calibrate the DOFTS for I/I identification in drainage pipeline, wherein the device comprises a temperature-adjustable water supply tank 1, a water pump 2, an experimental pipeline 3, a flow rate and water temperature control programmable logic controller (PLC) system 4, a DOFTS for I/I identification 5, and a unit of simulating external water I/I into experimental pipeline 6.

A water circulation is achieved by the temperature-adjustable water supply tank 1 communicated with a water inlet of the water pump 2 through a first connecting pipe; a water outlet of the water pump 2 is communicated with a water inlet of the experimental pipeline 3 through a second connecting pipe; a water outlet of the experimental pipeline 3 is communicated with the top side of the temperature-adjustable water supply tank 1 through a third connecting pipe. A plurality of high-accuracy physical water temperature sensors 31 are arranged in the experimental pipeline 3, and the plurality of high-accuracy physical water temperature sensors 31 are arranged in an extending direction of the experimental pipeline 3; each high-accuracy physical water temperature sensor 31 is electrically connected to the centralized PLC system 4, and the plurality of high-accuracy physical water temperature sensors 31 separately detect water information at designed locations, and display the information.

The DOFTS for I/I identification 5 comprises: a data acquisition and transmission system of distributed optical fiber 51 and an optical fiber 52; the data acquisition and transmission system of distributed optical fiber 51 comprises: a pulse laser source, a data acquisition card, and a photoelectric converter; a first end of the optical fiber 52 is connected to the pulse laser source; a second of the optical fiber 52 is laid within the experimental pipeline 3; the pulse laser source emits laser to the optical fiber 52; the laser is transmitted into the experimental pipeline 3 along the optical fiber 52 and is scattered in the experimental pipeline 3; the scattered laser is transmitted back to the DOFTS for I/I identification 5 through the optical fiber 52; the data acquisition card acquires the scattered laser and de-codes the acquired information through the photoelectric converter, and temperature information inside the experimental pipeline 3 is obtained; the second end of the optical fiber 52 is threaded out of a side wall of the experimental pipeline 3, and the second end of the optical fiber 52 is far away from the first end of the optical fiber 52, which facilitates the extension of a main body of the optical fiber 52 in the experimental pipeline 3

In this embodiment, scales are arranged on an outer side wall of the experimental pipeline 3, which facilitate identification of changes in temperature information at different locations.

A gas release hole 32 is set up in a top side of the experimental pipeline 3, and the gas release hole is equipped with a detachable plug, the in-pipe air in the experimental pipeline 3 can be released through the gas release hole 32, so that experiments in a partial full pipe state and a full-pipe state can be performed.

An I/I hole 33 is set up in a top side of the experimental pipeline 3, and the I/I hole 33 is equipped with a detachable plug.

The centralized PLC system 4 is provided with a PLC programming module 41, a frequency converter 42 and a control screen 43. The control screen 43 is electrically connected to the PLC programming module 41 for human-computer interaction and instruction inputting. The PLC programming module 41 is electrically connected to the frequency converter 42, and the PLC programming module 41 inputs an instruction to the frequency converter 42.

The water pump 2 is electrically connected to the frequency converter 42, and the frequency converter 42 controls the rotation speed of the water pump 2, so as to control the operation of the water pump 2.

A first one-way electromagnetic control valve and a first electromagnetic flow meter are arranged on the first connecting pipe;

a second one-way electromagnetic control valve and a second electromagnetic flow meter are arranged on the second connecting pipe;

a third one-way electromagnetic control valve and a third electromagnetic flow meter are arranged on the third connecting pipe;

the first connecting pipe is provided with the first one-way electromagnetic control valve, the first electromagnetic flow meter, the second one-way electromagnetic control valve, the second electromagnetic flow meter, the third one-way electromagnetic control valve, and the third electromagnetic flow meter respectively; the PLC programming module 41 is electrically connected to the first one-way electromagnetic control valve, the first electromagnetic flow meter, the second one-way electromagnetic control valve, the second electromagnetic flow meter, the third one-way electromagnetic control valve, and the third electromagnetic flow meter respectively, monitoring the in-pipe flow condition of the first connecting pipe, the second connecting pipe and the third connecting pipe.

A first heating rod 11 and a high-accuracy physical water temperature sensor 12 are inserted into the temperature-adjustable water supply tank 1, and the first heating rod 11 and the high-accuracy physical water temperature sensor 12 are electrically connected to the PLC programming module 41 respectively, enabling to adjust the water temperature of temperature-adjustable water supply tank 1.

The unit of simulating external water I/I into experimental pipeline 6 comprises: a temperature-adjustable water storage tank for simulating external water I/I into experimental pipeline 61, a water tank connecting pipe 62, and a water distribution pipe 63, a water outlet of the temperature-adjustable water storage tank for simulating external water I/I into experimental pipeline 61 is communicated with a water inlet of the water tank connecting pipe 62 through an electric regulating valve; a water outlet of the connecting pipe is communicated with a side wall of the experimental pipeline 3 through the water distribution pipe 63. The temperature-adjustable water storage tank 61 supplies water into the experimental pipeline 3 through the water tank connecting pipe 62 and the water distribution pipe 63, which simulates different scenarios of I/I into the experimental pipeline 3.

In this embodiment, two I/I holes 33 are set up in a side wall of the experimental pipeline 3 with a certain distance; the water tank connecting pipe 62 is communicated with the two I/I holes 33, respectively through two water distribution pipes 63, so that a dynamic I/I experiment can be achieved.

The second heating rod 611 and the high-accuracy physical water temperature sensor in (I/I) water storage tank 612 are inserted into the temperature-adjustable water storage tank for simulating external water I/I into experimental pipeline 61, and the second heating rod 611 and the high-accuracy physical water temperature sensor in (I/I) water storage tank 612 are electrically connected to the PLC programming module 41 respectively, enabling to adjust the I/I water temperature.

An electric regulating valve and an electromagnetic flow meter are arranged on the water tank connecting pipe 62; and the electric regulating valve and the electromagnetic flow meter are electrically connected to the PLC programming module 41 respectively to adjust the flow rate of the water tank connecting pipe 62.

In this embodiment, as shown in the figure, the experimental pipeline 3 is composed of several pipe segments, the pipe segments are connected by flanges, and each pipe segment is supported with a support frame 7. The flange is arranged at a port of the end pipe segment, and the flange at the port is connected with an end cover; and the optical fiber 52 passes through the end cover and extends into the experimental pipeline 3.

In another embodiment, the gas release hole 32 is a vent valve.

A sensitivity testing method to calibrate the DOFTS for I/I identification, wherein the method comprises the following steps:

S1, opening the first one-way electromagnetic control valve, the second one-way electromagnetic control valve, and the third one-way electromagnetic control valve in sequence, and turning on the water pump 2;

S2, opening the electric regulating valve on the water tank connecting pipe 62, and enabling water in the temperature-adjustable water storage tank 61 to flow into the experimental pipeline;

in steps S1 and S2, heating of the first heating rod 11 is regulated; heating of the second heating rod 611 is regulated; temperatures of in-pipe water and external I/I water are controlled;

and various combination scenarios of inflow rate, water temperature of experimental pipeline and those of I/I water are tested.

S3, enabling water in the temperature-adjustable water supply tank 1 flow into the experimental pipeline 3, detecting the water temperature of the experimental pipeline by the high-accuracy physical water temperature sensors 31 at designated stations, and transmitting water temperature information to the centralized PLC system 4 for continuous recording and data information storage;

S4, transmitting the laser emitted by the pulse laser source into the experimental pipeline 3 along the optical fiber 52, and scattering the transmitted laser back to the DOFTS for I/I identification 5 through the optical fiber 52, acquiring, by the data acquisition card, and decoding the acquired information through the photoelectric converter to obtain spatial-temporal continuous temperature information in the experimental pipeline 3;

S5, comparing water temperature data displayed in the centralized PLC system 4 with water temperature data measured by the DOFTS for I/I identification 5, and determining noise and the detection sensitivity of the optical fiber sensing system.

The invention claimed is:

1. A sensitivity testing device to calibrate a distributed optic-fiber temperature sensing (DOFTS) for inflow and infiltration (I/I) identification in a drainage pipeline, wherein the device comprises:

a temperature-adjustable water supply tank, a water pump, an experimental pipeline, a centralized programmable logic controller (PLC) system, a DOFTS for I/I identification, and a unit of simulating external water I/I into experimental pipeline;

the temperature-adjustable water supply tank is communicated with a water inlet of the water pump through a first connecting pipe; a water outlet of the water pump is communicated with a water inlet of the experimental pipeline through a second connecting pipe; a water outlet of the experimental pipeline is communicated with the temperature-adjustable water supply tank through a third connecting pipe;

a high-accuracy physical water temperature sensor is arranged in the experimental pipeline, and the high-accuracy physical water temperature sensor is electrically connected to the centralized PLC system;

the DOFTS for I/I identification comprises a data acquisition and transmission system of distributed optical fiber and an optical fiber; the data acquisition and transmission system of distributed optical fiber comprises: a pulse laser source, a data acquisition card, and a photoelectric converter; a first end of the optical fiber is connected to the pulse laser source; a second end of the optical fiber is laid within the experimental pipeline; the pulse laser source emits laser to the optical fiber; the laser is transmitted into the experimental pipeline along the optical fiber and is scattered in the experimental pipeline; the scattered laser is transmitted back to the DOFTS for I/I identification through the optical fiber; the data acquisition card acquires the scattered laser and de-codes the acquired information through the photoelectric converter, and temperature information inside the experimental pipeline is obtained; and the unit of simulating external water I/I into experimental pipeline comprises: a temperature-adjustable water storage tank for simulating external water I/I into experimental pipeline, a water tank connecting pipe, and a water distribution pipe; the temperature-adjustable water storage tank for simulating external water I/I into experimental pipeline is provided with a second heating rod, a high-accuracy physical water temperature sensor in I/I water storage tank, and an electric regulating valve and is electrically connected to the centralized PLC system; a water outlet of the temperature-adjustable water storage tank for simulating external water I/I into experimental pipeline is communicated with a water inlet of the water tank connecting pipe through an electric regulating valve; a water outlet of the connecting pipe is communicated with a top wall of the experimental pipeline through the water distribution pipe.

2. The sensitivity testing device to calibrate the DOFTS for I/I identification in drainage pipeline according to claim 1, wherein the second end of the optical fiber is threaded out of a side wall of the experimental pipeline.

3. A sensitivity testing method to calibrate the DOFTS for I/I identification in a drainage pipeline performed by the device according to claim 2, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

4. The sensitivity testing device to calibrate the DOFTS for I/I identification in drainage pipeline according to claim 1, wherein a frequency converter is arranged on the water pump, and the frequency converter is electrically connected to the centralized PLC system.

5. A sensitivity testing method to calibrate the DOFTS for I/I identification in a drainage pipeline performed by the device according to claim 4, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

6. The sensitivity testing device to calibrate the DOFTS for I/I identification in drainage pipeline according to claim 1, wherein a gas release hole is set up in a top side of the experimental pipeline, and the gas release hole is equipped with a detachable plug.

7. A sensitivity testing method to calibrate the DOFTS for I/I identification in a drainage pipeline performed by the device according to claim 6, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

8. The sensitivity testing device to calibrate the DOFTS for I/I identification in drainage pipeline according to claim 1, wherein an I/I hole is set up in a top side of the experimental pipeline, and the I/I hole is equipped with a detachable plug.

9. A sensitivity testing method to calibrate the DOFTS for I/I identification in a drainage pipeline performed by the device according to claim 8, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

10. The sensitivity testing device to calibrate the DOFTS for I/I identification in drainage pipeline according to claim 1, wherein a first one-way electromagnetic control valve and a first electromagnetic flow meter are arranged on the first connecting pipe;

a second one-way electromagnetic control valve and a second electromagnetic flow meter are arranged on the second connecting pipe;

a third one-way electromagnetic control valve and a third electromagnetic flow meter are arranged on the third connecting pipe;

the centralized PLC system is electrically connected to the first one-way electromagnetic control valve, the first electromagnetic flow meter, the second one-way electromagnetic control valve, the second electromagnetic flow meter, the third one-way electromagnetic control valve, and the third electromagnetic flow meter respectively.

11. A sensitivity testing method to calibrate the DOFTS for I/I identification in a drainage pipeline performed by the device according to claim 10, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

12. The sensitivity testing device to calibrate the DOFTS for I/I identification in drainage pipeline according to claim 1, wherein a first heating rod and a high-accuracy physical water temperature sensor in water supply tank are inserted into the temperature-adjustable water supply tank, and the first heating rod and the high-accuracy physical water temperature sensor in water supply tank are electrically connected to the centralized PLC system respectively.

13. A sensitivity testing method to calibrate the DOFTS for I/I identification in a drainage pipeline performed by the device according to claim 12, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

14. The sensitivity testing device to calibrate the DOFTS for I/I identification in drainage pipeline according to claim 1, wherein the second heating rod and the high-accuracy physical water temperature sensor in (I/I) water storage tank are inserted into the temperature-adjustable water storage tank for simulating external water I/I into experimental pipeline, and the second heating rod and the high-accuracy physical water temperature sensor in (I/I) water storage tank are electrically connected to the centralized PLC system respectively; and an electric regulating valve and an electromagnetic flow meter are arranged on the water tank connecting pipe; the electric regulating valve and the electromagnetic flow meter are electrically connected to the centralized PLC system respectively.

15. A sensitivity testing method to calibrate the DOFTS for I/I identification in a drainage pipeline performed by the device according to claim 14, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

16. A sensitivity testing method to calibrate the DOFTS for I/I identification in a drainage pipeline performed by the device according to claim 1, wherein the method comprises:

S1, opening the first one-way electromagnetic control valve, the second one-way electromagnetic control valve, and the third one-way electromagnetic control valve in sequence, and turning on the water pump;

S2, opening the electric regulating valve on a connecting pipe of the temperature-adjustable water storage tank for simulating external water I/I into experimental pipeline, and enabling water in the temperature-adjustable water storage tank to flow into the experimental pipeline;

S3, enabling water in the temperature-adjustable water supply tank flow into the experimental pipeline, detecting water temperature of the experimental pipeline by the high-accuracy physical water temperature sensor at designated stations, and transmitting water temperature information to the centralized PLC system for continuous recording and data information storage;

S4, transmitting the laser emitted by the pulse laser source into the experimental pipeline along the optical fiber, scattering the transmitted laser back to the DOFTS for I/I identification through the optical fiber, acquiring, by the data acquisition card, and decoding the acquired information through the photoelectric converter to obtain spatial-temporal continuous temperature information in the experimental pipeline; and S5, comparing water temperature data displayed in the centralized PLC system with water temperature data measured by the DOFTS for I/I identification, and determining noises and the detection sensitivity of the optical fiber sensing system.

17. The sensitivity testing method to calibrate the DOFTS for I/I identification in drainage pipeline according to claim 16, wherein in steps S1 and S2, heating of the first heating rod is regulated; heating of the second heating rod is regulated; temperatures of in-pipe water and external I/I water are controlled; and various combination scenarios of inflow rate, water temperature of experimental pipeline and those of I/I water are tested.

* * * * *